Sept. 29, 1936.  H. SIEMUND  2,056,127
MOLDING APPARATUS
Filed Oct. 15, 1932   3 Sheets-Sheet 2

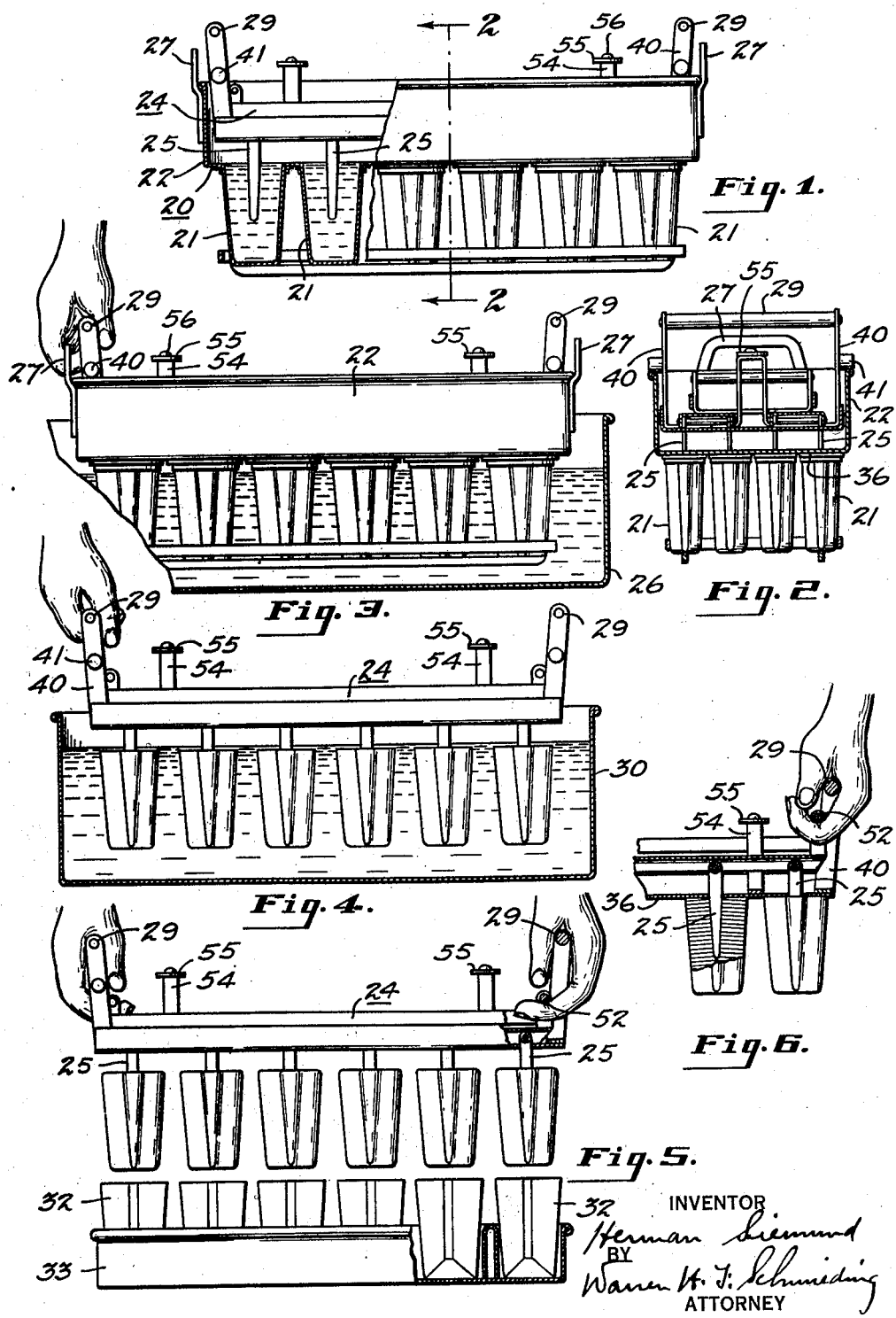

INVENTOR
Herman Siemund
BY
Warren H. F. Schmieding
ATTORNEY

Patented Sept. 29, 1936

2,056,127

UNITED STATES PATENT OFFICE 2,056,127

MOLDING APPARATUS

Herman Siemund, Chicago, Ill., assignor, by mesne assignments, to Joe Lowe Corporation, a corporation of Delaware Application October 15, 1932, Serial No. 637,940

16 Claims. (Cl. 107—8)

The present invention relates to the art of forming, refrigerating and harvesting frozen bodies such as edible novelties.

Frozen novelties are usually made in molds which are subjected to freezing temperature and are then removed from the molds in a suitable manner. One method of removing the frozen confection from the mold is to freeze pegs in the confection and then utilize the pegs for withdrawing the confection from the mold after the bond is broken between the confection and mold. When it is desirable to coat the frozen confection, for example with chocolate, the pegs can be used for holding or manipulating the confection while the coating is being applied. By the succession of use of the pegs for this purpose, increasing layers of coating cling to the peg rendering the same troublesome.

One of the objects of the present invention is to provide an improved harvesting device for confections including a grid structure which receives pegs and which is arranged to engage the confection for forcing the same from the pegs, and, to arrange the elements of the harvesting device so that the pegs are wiped clean every time the confection is removed therefrom, and, also to arrange the elements so as to prevent binding of the pegs in the openings in the grid structure even though the pegs are bent from normal.

Further objects and advantages will be apparent from the following description, reference being had to the accompanying drawings, wherein preferred forms of embodiments are clearly shown.

In the drawings:

Fig. 1 is a side view of a mold and a peg assembly, part thereof being broken away and shown in section;

Fig. 2 is a sectional view taken on line 2—2 of Fig. 1;

Fig. 3 is a side view of the molds showing the same inserted in a defrosting tank;

Fig. 4 is a side view of the peg assembly with the confection frozen thereto and with the confection immersed in a coating bath;

Fig. 5 is a side view showing the confections about to be removed from the peg assembly;

Fig. 6 is a fragmentary sectional view of a part of the structure shown in Fig. 5 but on a larger scale and in a slightly different position;

Figure 7:
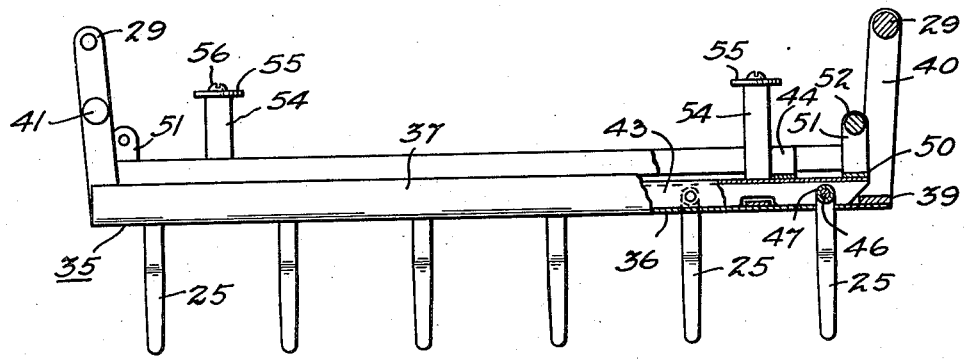
Fig. 7 is a side view of the peg assembly partly in section.
Figure 8:
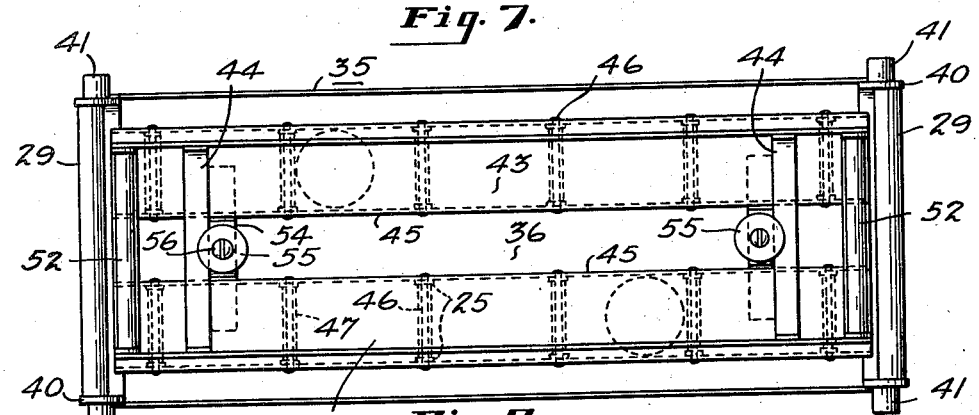
Fig. 8 is a top plan view of the structure shown in Fig. 7.
Figure 9:
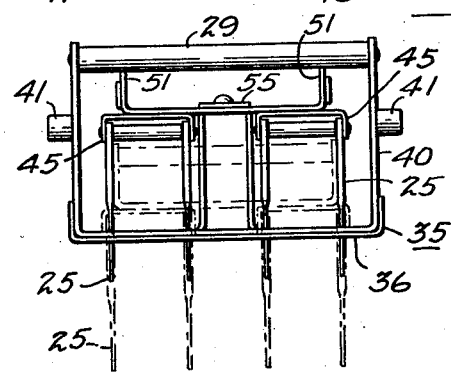
Fig. 9 is an end view of the structure shown in Fig. 7.
Figure 10:
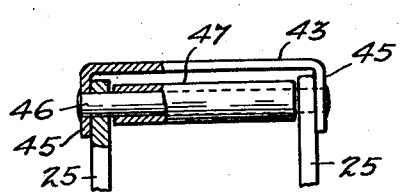
Fig. 10 is a fragmentary end view but on a somewhat larger scale.

Referring in general to the drawings, I have provided a mold structure 20 including a plurality of individual molds 21 which depend from a chamber 22. The material to be frozen into a frozen confection is poured into the chamber 22 to substantially fill the individual molds 21. The molds 21 are then suitably refrigerated, as for example by inserting the same in a brine tank to cause the freezing of the material. Prior to the solidification of the material and preferably at the time the material is placed in the molds, a peg assembly such as that shown at 24 is inserted into the molds. This peg assembly includes a plurality of pegs 25, one for each mold 21. After the material is frozen, the mold structure 20 is removed from the brine tank and the bond between the frozen confection and the mold is broken. The preferred manner of doing this is by inserting the mold structure 20 into a defrosting tank 26, handles 27 being provided on the mold for manipulating the same. The defrosting tank contains warm water and the mold structure is inserted into this warm water for a period sufficient only for slightly melting the periphery of the frozen confection whereby to break the bond between the confection and the molds. The confection, still clinging to the pegs 25, can be withdrawn from the molds 21 by lifting upwardly on the peg structure 24 by handles 29 provided for this purpose.

If it is desirable to coat the frozen confection, as for example with chocolate, the peg structure 24 may be utilized for manipulating or holding the confection while the coating is being applied and preferably this coating is applied by dipping the confection into a tank 30 (see Fig. 4) which may contain chocolate or any other suitable coating material. After the coating is hardened by being refrigerated by the frozen confection, the frozen confection is removed from the pegs and may be dropped directly into bags 32 carried by a rack 33 (see Fig. 5). If desirable a handle stick may be inserted into the holes formed by the peg.

Referring more in detail to the drawings, I have shown a grid structure 35 including a flat plate 36 having upwardly extending side walls 37. Plate 36 is provided with four rows of slots, each row including six slots. At the opposite ends of the plate there are carried frames 39 including uprights 40 connected by the handle 29 by which the entire peg assembly may be manipulated. Studs 41 are carried by the uprights 40 and are arranged to rest upon the upper edge of the mold structure 20 so as to properly space the peg assembly in the mold structure.

The peg structure includes two inverted channel irons 43 which are tied together by tie strips 44. The downwardly extending side walls 45 of the irons 43 carry pins 46 and each pin carries two pegs or spurs 25. These spurs are loosely mounted upon the pins and sleeves 47 are provided for limiting the movement of the spurs. In the present instance twenty four spurs are provided which are aligned with the corresponding number of slots in the plate 36 of the grid structure 35. Frames 50 are attached to opposite ends of the peg structure and include uprights 51 connected at their upper end by handles 52. It will be noted that the handle 52 is placed close enough to the handle 29 so that the operator may grasp both with one hand, and then by closing the hand the spur structure will be pulled upwardly causing the pegs 25 to be moved upwardly. Upwardly extending posts 54 are carried by the plate 36 which in turn carries discs 55 held in place by screws 56. The tie strips 44 for the channels 43 are disposed adjacent the posts 54 and the discs 55 lie in the path of movement of the strips 44 so as to limit the upward movement of the spur structure so as to prevent the spurs 25 from being withdrawn from the slots in plate 36.

In order to prevent the frozen confection from freezing directly to the under side of plate 36, the studs 41 maintain the plate 36 spaced from the top of the molds 21. In the forms shown in Figs. 7 to 12 inclusive the upper ends of the spurs 25 are somewhat thicker than the lower ends. This facilitates the removal of the confection from the spurs. Moreover it is desirable to thoroughly clean each spur at the time that confection is being removed. This is done by providing a snug fit between the upper part of the spurs and the openings in plate 36 and particularly by providing a snug fit between the flat wide sides of the spurs. When the handles 52 are drawn upwardly any accumulation of frost, frozen confection or coating clinging to the spurs will be wiped off of the spurs by the plate. In this manner on re-using the assembly the old confection or coating will not be mixed with the new confection.

It has been found that in handling the assembly the spurs are often bent slightly, and in order to provide for the free up and down movement of the spurs within the tightly fitting slots it is desirable that the spurs 25 fit loosely upon the pins 46, also, by narrowing the lower ends of the spurs 25 the spurs 25 may be bent considerably before there is any tendency of the same to bind in the slots in the plate 36.

Figures 11, 12:
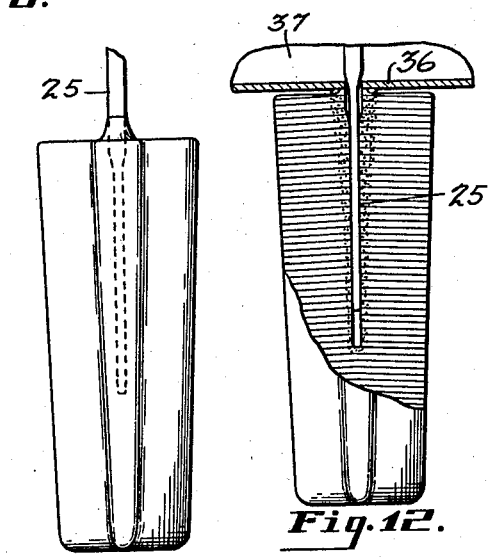
Fig. 11 is an end view of the frozen confection showing the peg frozen therein.
Fig. 12 is an end view of the confection partly in section and showing the peg partly withdrawn therefrom.

After the bond has been broken between the confection and the molds 21, the confection may be withdrawn from the molds by lifting upwardly on the handles 29 of the peg assembly. This assembly may be used for holding and manipulating the confection when the coating is being applied. The operator may then insert his fingers underneath the handles 52 and by closing the hand, the spur structure will be pulled upwardly causing the spurs to slide upwardly through the slots in the plate 36 scraping the frost, frozen confection or coating from the peg and by continued upward movement the top of the confection will engage the bottom of the plate 36, as shown in Fig. 12, to prevent further upward movement of the confection and the withdrawal of the spur from the confection. If desired a wooden handle stick may be inserted in the holes formed by the spurs 25.

In Figs. 13 to 17 inclusive, another embodiment of the invention is shown. In accordance with this form, two spurs 25a are formed by one U-shaped piece of material. The yokes 60 of a pair of these U-shaped pieces are each connected to a strip 61. Strips 61 are arranged parallel with one another and are connected with one another by longitudinally disposed strips 62. This structure is further strengthened by transverse strips 63 and longitudinal strips 65 connected to the upstanding ends 66 of strips 63. The uprights 51 for handles 52 are connected with strips 62 and 63.

In this embodiment, the walls forming the holes receiving the spurs 25a also closely embrace the spurs for scraping the same. The side walls of the openings are resilient, being formed by spring clips 67. These clips are disposed above grid plate 36a and extend downwardly through relatively large openings 36b in the plate and are secured, as by soldering, to the plate 36a at a substantial distance from the openings 36b. Thus it is apparent that the clips 67 provide resilient side walls for the openings for the spurs and should the spurs become bent, the resilient strips nevertheless will scrape the flat sides of the spurs.

Figure 13:
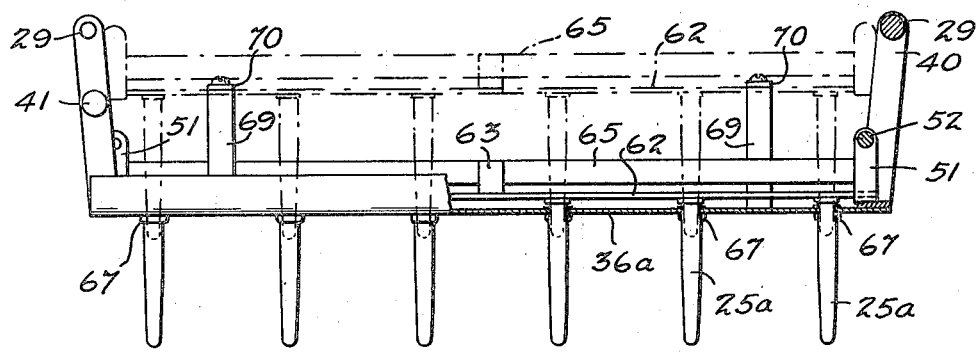
Fig. 13 is a view similar to Fig. 7 showing a modified form of the invention.
Figure 14:
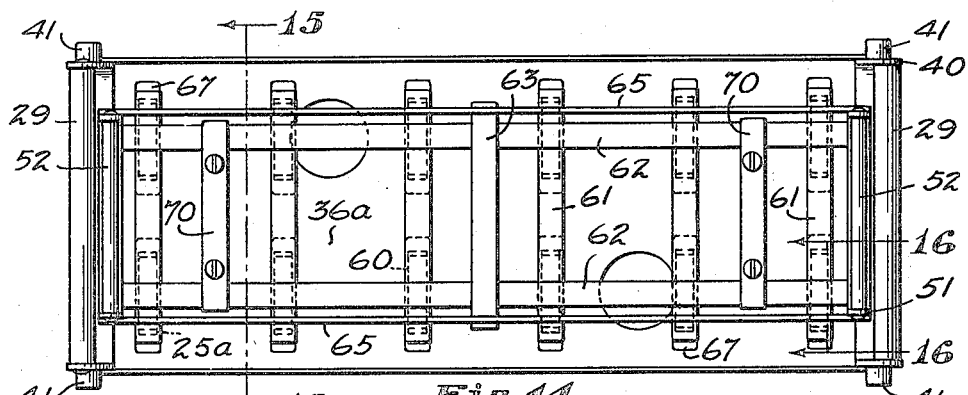
Fig. 14 is a top plan view of the structure shown in Fig. 13.
Figure 15:
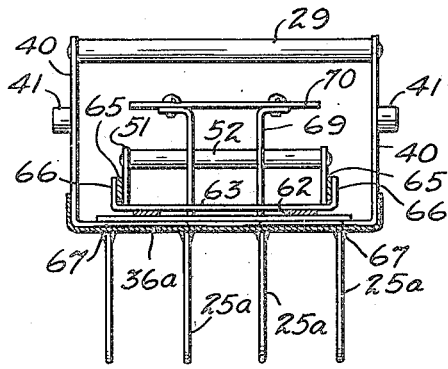
Fig. 15 is a sectional view taken on line 15—15 of Fig. 14.
Figure 16:
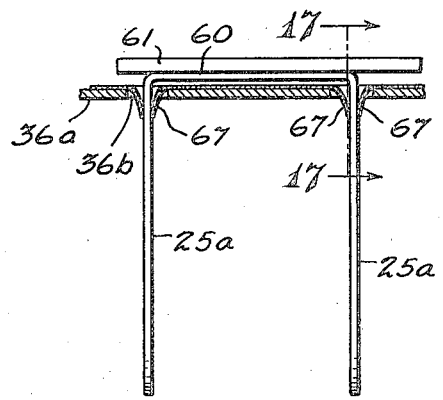
Fig. 16 is a fragmentary sectional view taken on line 16—16 of Fig. 14.
Figure 17:
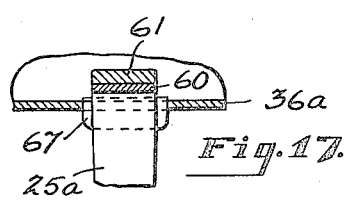
Fig. 17 is a fragmentary sectional view taken on line 17—17 of Fig. 16.

It will be noted from Fig. 13 that the upward movement of the spur structure is limited so that the spurs 25a will not be withdrawn from the grid structure. In this form each U-shaped bracket 69 has its yoke portion suitably secured to plate 36a. A strip 70 is secured to the top of each bracket 69 and overlies the strips 62. These strips 62 and 70 limit the upward movement of the spur structure.

In operation when the spur structure is pulled upwardly the strips first scrape the frost, confection or coating from the spurs 25a and if the confection is not frozen to the spur pegs too tightly they will force the confection from the spurs. In some instances, however, the clips 67 will enter into the confection and the bond between the confection and spurs will not be broken until the top of the confection reaches the bottom of the strips 36a.

If desired, all the parts herein shown may be made of sheet metal.

While the forms of embodiments of the present invention as herein disclosed constitute preferred forms, it is to be understood that other forms might be adopted all coming within the scope of the claims that follow.

What I claim is as follows:

1. In a refrigerating device a peg supporting member having a downwardly depending peg swingably supported thereby, and a second member movable with respect to said peg supporting member provided with a perforation through which said peg projects.

2. In a refrigerating device a peg supporting member provided with downwardly supporting pegs swingably supported thereby, each of said pegs having a relatively thin portion adjacent its free end and a relatively thicker portion adjacent its other end.

3. In a refrigerating device a peg supporting member provided with downwardly supporting pegs swingably supported thereby, each of said pegs having a relatively thin portion adjacent its free end and a relatively thicker portion adjacent its other end, and a second member beneath said peg supporting member and movable with respect thereto and provided with apertures through which said pegs project.

4. In a refrigerating device a peg supporting member provided with downwardly supporting pegs swingably supported thereby, each of said pegs having a relatively thin portion adjacent its free end and a relatively thicker portion adjacent its other end, and a second member beneath said peg supporting member and movable with respect thereto and provided with apertures through which the thinner portion and a part of the thicker portions of said pegs project.

5. In a refrigerating device a peg supporting member having downwardly depending pegs thereon, each of said pegs consisting of a relatively thin portion adjacent its free end and a thicker portion adjacent its other end, mold units suitably spaced to each receive one of said pegs, and means for supporting said peg supporting member above said mold units so that the thinner portion and a part of the thicker portion of each peg is contained within its respective mold unit.

6. In a refrigerating device a peg supporting member having downwardly depending pegs swingably mounted thereon, each of said pegs consisting of a relatively thin portion adjacent its free end and a thicker portion adjacent its other end, mold units suitably spaced to each receive one of said pegs, and means for supporting said peg supporting member above said mold units so that the thinner portion and a part of the thicker portion of each peg is contained within its respective mold unit.

7. In a refrigerating device of the class described, a mold adapted to contain a substance to be frozen in combination with a peg supporting member having a downwardly depending peg loosely supported thereby and adapted to extend centrally into the substance in the mold, said peg adapted to be frozen within the substance in the mold and being capable of being withdrawn therefrom to provide an aperture in the frozen substance.

8. In a refrigerating device a peg supporting member having a plurality of downwardly depending pegs loosely supported thereby, and a second member movable with respect to said peg supporting member provided with apertures through which said pegs project.

9. In a refrigerating device a peg supporting member having a plurality of downwardly depending pegs pivotally supported thereby, and a second member provided with apertures through which said pegs project, said peg supporting member being movable with respect to said second member.

10. A device of the kind described comprising a base plate, a spur supporting member, a plurality of spaced apertures in said base plate, a plurality of spurs pivotally mounted on said spur supporting member, said spurs projecting through said apertures, said spur supporting member movable with respect to said base plate to vary the distance to which said spurs project through said base plate.

11. A device of the kind described comprising a spur supporting member having a plurality of spurs disposed in spaced relationship, each spur adapted to be inserted end-wise into an individual mass to be solidified with one end projecting from said mass and attached to said spur supporting member, each spur being thinner over a portion adjacent its inserted end, said portion having opposed edges tapering toward said last mentioned end, the remainder of the inserted portion of each spur being relatively thicker, and means for stripping each spur from its individual mass after the solidification of said mass, said means including means for simultaneously scraping said solidified mass from faces of said thicker portion of each spur to maintain the surface of said solidified mass adjacent said thicker portion of said spur in a substantially unaltered condition, and to leave in said solidified mass an aperture conforming substantially to the shape of the previously inserted portion of said spur.

12. A device of the kind described, comprising a plurality of spurs disposed in spaced relationship, each spur adapted to be inserted end-wise into an individual mass to be solidified with one end projecting from said mass, each spur being thinner over a portion adjacent its inserted end, said portion having opposed edges tapering toward said last mentioned end, the remainder of the inserted portion of said spur being relatively thicker and of substantially uniform width, and means for simultaneously stripping each spur from its individual mass after the solidification of said mass, said means including means for moving each spur relative to its adhering mass and for simultaneously engaging said mass about and in close proximity to faces of said thicker portion of said spur.

13. In a device of the kind described a spur having a portion adapted to be inserted end-wise into a mass to be solidified, said spur over a portion adjacent its inserted end being relatively thinner, the remainder of the inserted portion of said spur being relatively thicker, and means for stripping said spur from said mass after the solidification of said mass, said means including means for engaging the surface of said mass about the thicker portion of said spur and for scraping faces of said thicker portion.

14. A device of the kind described comprising, a base plate, a spur supporting member, a plurality of spaced apertures in said base plate, a plurality of spurs pivotally mounted on said spur supporting member, each spur projecting through one of said apertures, said spur supporting member movable with respect to said base plate to vary the distance to which said spurs project through said base plate, each aperture being of a contour so that a pair of opposed edges thereof relatively closely confines a pair of opposed faces of its respective spur at least over a length of said spur between a position of relative full projection and a position of partial projection.

15. A device of the kind described comprising, a base plate, a spur supporting member, a plurality of spaced apertures in said base plate, a plurality of spurs pivotally mounted on said spur supporting member, the free end of each spur projecting through one of said apertures, said spur supporting member movable with respect to said base plate to vary the distance to which said spurs project through said base plate, said spurs being relatively thinner between the free ends thereof and points intermediate their ends, said apertures being of a contour so as to relatively closely confine the relatively thicker portions of said spurs at least on a pair of opposed faces of said thicker portions.

16. A device of the kind described, comprising a base plate, a spur supporting member, a plurality of spaced apertures in said base plate, a plurality of spurs pivotally mounted on said spur supporting member, the free end of each spur projecting through one of said apertures, said spur supporting member movable with respect to said base plate to vary the distance to which said spurs project through said base plate, said spurs being relatively thinner between the free ends thereof and points intermediate their ends, said apertures being of a contour so as to relatively closely confine the relatively thicker portions of said spurs at least on a pair of opposed faces of said thicker portions, said thicker portions being of substantially uniform cross-section, said thinner portions having side edges disposed in converging relationship from said thicker portions toward said free ends.

HERMAN SIEMUND.